Aug. 7, 1928.
J. T. CONROY ET AL
1,680,087
DRYING BLEACHING POWDER
Filed Feb. 12, 1926
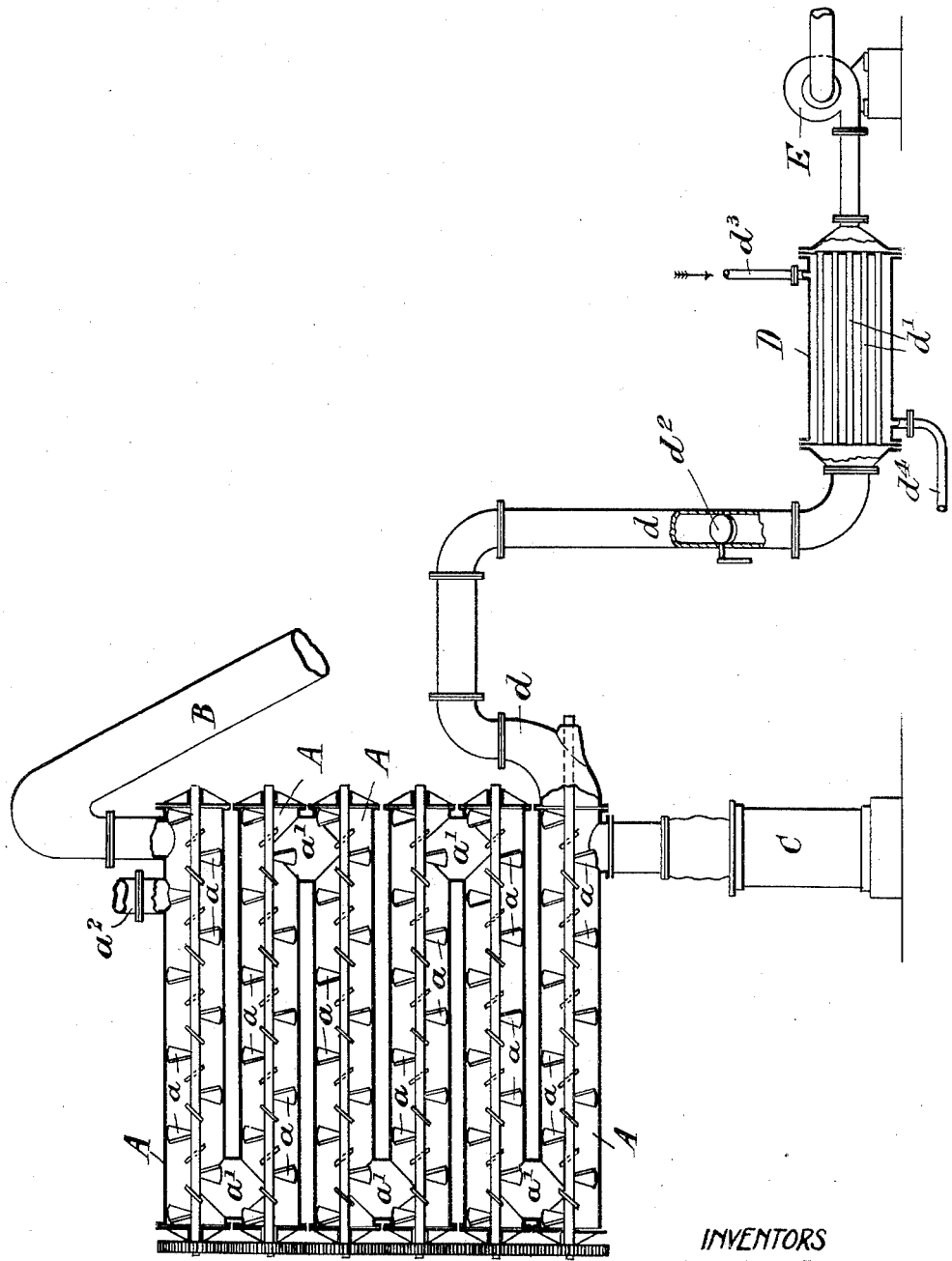
INVENTORS
JAMES TERENCE CONROY
ALFRED LAMBLE and
JOHN JAMES LATHAM
BY THEIR ATTORNEYS
*Howson and Howson*

Patented Aug. 7, 1928.

1,680,087

UNITED STATES PATENT OFFICE.

JAMES TERENCE CONROY, ALFRED LAMBLE, AND JOHN JAMES LATHAM, OF LIVERPOOL, ENGLAND, ASSIGNORS TO THE UNITED ALKALI COMPANY LIMITED, OF LIVERPOOL, ENGLAND.

DRYING BLEACHING POWDER.

Application filed February 12, 1926, Serial No. 87,970, and in Great Britain May 15, 1925.

Bleaching powder is a valuable and well known reagent formed by the absorption of chlorine by hydrated lime. Its active value is measured in terms of "available chlorine" and in a high grade commercial product such value reaches to from 35 to 37 per cent. It is well known that this valuable reagent is unstable, that is to say, its strength decreases on storage, and that such decrease is remarkably rapid in tropical countries, or generally speaking at high temperatures.

Investigation has shewn that the rate of decomposition depends on many factors, amongst which may be mentioned the presence of metallic oxides such as ferric oxide ($Fe_2O_3$), organic matter, and moisture. Elimination of oxide of iron, and the like, may be effected by a suitable selection of lime, and choice of absorption plant, whilst the ill effects of moisture can only be eliminated by its removal or by fixation. Up to the present time the ill effects of moisture have been minimized by fixation, as for example, by the addition of quick lime (CaO) in suitable proportion, but this entails a corresponding decrease in the percentage of available chlorine in the final product.

The possibility of dehydrating in vacuo without undue decomposition has been suggested and all experimental and general investigations have shewn that elevation of temperature at ordinary pressure leads to decomposition at a rapid rate, and that hot packing may result in a spontaneous temperature rise sufficient in some cases to cause complete decomposition of the parcel.

In British Patent No. 242,805 to A. Lamble and the United Alkali Co., dated December 15th, 1924 there is described a process generally for making a high strength stable bleaching powder by adding quicklime (CaO) to the dehydrated powder. Our present invention relates to improvements in connection with the dehydration of the said bleaching powder and we have now found that whilst it is impracticable to dehydrate bleaching powder satisfactorily by a rapid heating to the requisite temperature, a good dehydration may be attained by the use of a progressive temperature rise, on the counter current principle, for as the moisture content is decreased the stability is so increased as to admit of the employment of a steadily increasing temperature for further water removal.

The process is made continuous by feeding bleaching powder of normal quality into one end of the apparatus and supplying air or gas (which may be dried and freed of its carbon dioxide ($CO_2$) content) heated to a proper temperature at the other end thereof.

The accompanying drawing illustrates in elevation, partly in section, a suitable apparatus for carrying out the operation according to this invention, the said apparatus comprising a series of super-imposed cylinders, or chambers, A, provided with rotatable conveyors, or paddles $a$, (hereinafter referred to as the paddles) such as is used in the manufacture of bleaching powder by the Hasenclever process. The bleaching powder is fed by an elevator B into the upper cylinder, or chamber, A, along which it is caused to traverse and then passes down through a passage $a^1$ into the succeeding cylinder or chamber by the paddles $a$, and thereafter through each of the cylinders, or chambers, in succession and passes from the lower cylinder, or chamber, of the said series, into a drum, or other receptacle, C. The drying gas, usually air, is suitably heated and led from a preheater D, by a pipe $d$, into the said lower cylinder, or chamber, it passes up through each of the cylinders, or chambers, in succession, in the opposite direction to that of the bleaching powder, so that the gas, at its highest temperature meets the said bleaching powder in its driest condition and so on progressively until it leaves by an outlet $a^2$ at the opposite end of the apparatus to which it entered. The preheater D consists of a vessel having tubes $d^1$ therein through which the gas is forced by a fan E, the said gas being heated by steam admitted into the said vessel by a pipe $d^3$ and passes from the said vessel through an outlet pipe $d^4$, the heated gas passing as aforesaid by the pipe $d$ to the lowermost chamber A. We have found that very satisfactory results may be attained by heating the incoming gas to a temperature of say 220 degrees to 240 degrees Fahrenheit and regulating its rate of travel so that the exit temperature is in the region of 125 degrees Fahrenheit, the exact temperature limits varying somewhat with the type of plant used. The rate of travel of the gas may be regulated by any convenient means, for instance, by opening or closing a valve $d^2$ in the pipe $d$.

We do not limit our invention to the use of the particular form of drying apparatus described and shewn as it is evident that the apparatus may be modified, as desired, in form and construction.

What we claim is:—

In the drying of bleaching powder the step of increasing the temperature and the stability of the bleaching powder as its moisture content is decreased, by passing the bleaching powder through an apparatus in one direction, and passing heated gas through the apparatus in the opposite direction, in combination with regulating the rate of travel of the gas.

In testimony whereof we have signed our names to this specification.

JAMES TERENCE CONROY.
ALFRED LAMBLE.
JOHN JAMES LATHAM.